(12) United States Patent
Yamada et al.

(10) Patent No.: US 11,137,638 B2
(45) Date of Patent: Oct. 5, 2021

(54) LIQUID CRYSTAL DISPLAY DEVICE

(71) Applicant: FUJIFILM Corporation, Tokyo (JP)

(72) Inventors: Naoyoshi Yamada, Kanagawa (JP); Tatsuya Iwasaki, Kanagawa (JP); Katsufumi Ohmuro, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/190,112

(22) Filed: Mar. 2, 2021

(65) Prior Publication Data

US 2021/0191195 A1   Jun. 24, 2021

Related U.S. Application Data

(63) Continuation of application No. PCT/JP2019/035882, filed on Sep. 12, 2019.

(30) Foreign Application Priority Data

Sep. 12, 2018 (JP) .............................. JP2018-170735
May 29, 2019 (JP) .............................. JP2019-100243

(51) Int. Cl.
  *G02F 1/1335*  (2006.01)
(52) U.S. Cl.
  CPC .. *G02F 1/133531* (2021.01); *G02F 1/133514* (2013.01)
(58) Field of Classification Search
  CPC ................................................ G02F 1/133531
  See application file for complete search history.

(56) References Cited

U.S. PATENT DOCUMENTS

| 2010/0245726 A1 | 9/2010 | Utsumi et al. |
| 2012/0229738 A1* | 9/2012 | Toyama ............ G02F 1/133528 349/97 |

(Continued)

FOREIGN PATENT DOCUMENTS

| JP | 2006-301605 A | 11/2006 |
| JP | 2008-268778 A | 11/2008 |

(Continued)

OTHER PUBLICATIONS

International Search Report issued in PCT/JP2019/035882 dated Nov. 5, 2019.

(Continued)

*Primary Examiner* — Edmond C Lau
(74) *Attorney, Agent, or Firm* — Jean C. Edwards, Esq.; Edwards Neils LLC

(57) ABSTRACT

The present invention provides a liquid crystal display device which suppresses a color change of light leak depending on a direction in the visual recognition from an oblique direction during black display, and has high display quality. The liquid crystal display device includes, in order, at least: a first polarizer; an optically anisotropic layer a liquid crystal cell; and a second polarizer, the liquid crystal cell has pixels with a screen resolution of 250 ppi or more, the pixels each have at least blue, green, and red subpixels, the subpixel has a chevron structure in which an angle formed between at least one side and an absorption axis of the first polarizer or an absorption axis of the second polarizer is larger than 0° and not larger than 5°, and a depolarization degree of the liquid crystal cell in a visible light region satisfies a predetermined requirement.

20 Claims, 4 Drawing Sheets

(56) References Cited

U.S. PATENT DOCUMENTS

2014/0313461 A1* 10/2014 Kibe ................. G02F 1/133707
349/106
2015/0002789 A1    1/2015 Kaihoko et al.

FOREIGN PATENT DOCUMENTS

| JP | 2010-230742 A | 10/2010 |
| JP | 2014-016642 A | 1/2014 |
| JP | 2016-006439 A | 1/2016 |

OTHER PUBLICATIONS

Written Opinion issued in PCT/JP2019/035882 dated Nov. 5, 2019.
International Preliminary Report on Patentability completed by WIPO on Mar. 9, 2021 in connection with International Patent Application No. PCT/JP2019/035882.

* cited by examiner

LIQUID CRYSTAL DISPLAY DEVICE

CROSS-REFERENCE TO RELATED APPLICATIONS

This application is a Continuation of PCT International Application No. PCT/JP2019/035882 filed on Sep. 12, 2019, which was published under PCT Article 21(2) in Japanese, and which claims priority under 35 U.S.C. § 119(a) to Japanese Patent Application No. 2018-170735 filed on Sep. 12, 2018 and Japanese Patent Application No. 2019-100243 filed on May 29, 2019. The above applications are hereby expressly incorporated by reference, in their entirety, into the present application.

BACKGROUND OF THE INVENTION

1. Field of the Invention

The present invention relates to a liquid crystal display device.

2. Description of the Related Art

In-plane switching (IPS) type liquid crystal display devices and fringe field switching (FFS) type liquid crystal display devices do not adopt a mode in which an electric field is applied between upper and lower substrates to make a rise of a liquid crystal compound, thereby achieving driving as in a twisted nematic (TN) type and vertical alignment (VA) type, but are a method (mode) called an in-plane switching mode in which a liquid crystal compound is allowed to respond in a substrate in-plane direction by an electric field including a component substantially parallel to a substrate surface.

The IPS type and the FFS type are methods having few restrictions on the viewing angle in principle due to their structure, and are thus known as driving methods having characteristics such as a wide viewing angle and little chromaticity shift and tone change.

Regarding these in-plane switching mode liquid crystal display devices, JP2014-016642A discloses a configuration in which a polarizing plate, a liquid crystal layer, a color filter, and an optical compensation member are combined in order to reduce a color change of black display in an oblique direction.

SUMMARY OF THE INVENTION

JP2014-016642A describes a method in which by appropriately adjusting a thickness-direction retardation Rth of the color filter layer included in the liquid crystal cell, birefringence of the optical compensation member, or the like, light leak viewed from an oblique direction in a direction deviated from an absorption axis of the polarizer is reduced, and the viewing angle characteristics of the black display of the liquid crystal display device are improved.

However, according to the study by the inventors, it has been found that in a case where the method described in JP2014-016642A is used, it is possible to reduce the light leak viewed from the oblique direction in the direction deviated from the absorption axis of the polarizer, but light leak viewed from an oblique direction in a direction of the absorption axis of the polarizer cannot be reduced at all. Therefore, the viewing angle characteristics of the black display of the liquid crystal display device are not sufficiently improved by the method described in JP2014-016642A. It has also been found that in the method described in JP2014-016642A, the color of the light leak of the black display may vary in the direction of the absorption axis of the polarizer and in the direction deviated from the absorption axis of the polarizer, and the display quality may be deteriorated.

In addition, the inventors have further conducted study, and as a result, found that a color of light leak viewed from an oblique direction in a direction of the absorption axis of the polarizer and a color of light leak viewed from an oblique direction in a direction of a transmission axis of the polarizer (that is, a direction orthogonal to the absorption axis) may be visually recognized as a bluish color in one direction and as a reddish color in another direction. Therefore, it has been found that the color of the light leak continuously changes from blue to red depending on the direction, and the display quality of black display is significantly reduced.

It has also been found that the above problem is recognized as a particularly severe problem in a liquid crystal display device having a screen resolution of more than 250 ppi and capable of displaying a high quality image.

The invention is contrived in view of the circumstances, and an object thereof is to provide a liquid crystal display device which suppresses a color change of light leak visually recognized not only from a direction deviated from an absorption axis of a polarizer but also from an oblique direction in all directions, and has high display quality in black display.

The inventors conducted intensive study, and as a result, found that the object can be achieved by the following configurations.

[1] A liquid crystal display device comprising, in order, at least: a first polarizer; an optically anisotropic layer; a liquid crystal cell; and a second polarizer, in which the liquid crystal cell is an IPS mode or FFS mode liquid crystal cell which has a pair of substrates opposed to each other, at least one of which has an electrode, and a liquid crystal layer disposed between the pair of substrates and containing a liquid crystal compound whose alignment is controlled, and in which an electric field having a component parallel to the substrate is formed by the electrode, the liquid crystal cell has pixels with a screen resolution of 250 ppi or more, the pixels each have at least blue, green, and red subpixels, the subpixel has a chevron structure in which an angle formed between at least one side of the structure and an absorption axis of the first polarizer or an absorption axis of the second polarizer is larger than 0° and not larger than 5°, and a depolarization degree of the liquid crystal cell in a visible light region satisfies Expressions (1) and (2) to be described later.

[2] The liquid crystal display device according to [1], in which $\Delta nd$ of the liquid crystal layer at a wavelength of 550 nm is 330 nm or less.

[3] The liquid crystal display device according to [1] or [2], in which an in-plane retardation Re1 (550) at a wavelength of 550 nm and a thickness-direction retardation Rth1 (550) at a wavelength of 550 nm in the optically anisotropic layer satisfy Expressions (3) and (4) to be described later.

[4] The liquid crystal display device according to [1] or [2], in which the optically anisotropic layer is a laminate of a first optically anisotropic layer and a second optically anisotropic layer, an in-plane retardation Re1 (550) at a wavelength of 550 nm and a thickness-direction retardation Rth1 (550) at a wavelength of 550 nm in the first optically anisotropic layer satisfy Expressions (5) and (6), and an in-plane retardation Re2 (550) at a wavelength of 550 nm and a thickness-direction retardation Rth2 (550) at a wavelength of 550 nm in the second optically anisotropic layer satisfy Expressions (7) and (8) to be described later.

[5] The liquid crystal display device according to [4], in which the first optically anisotropic layer is a positive A-plate, and the second optically anisotropic layer is a positive C-plate.

[6] The liquid crystal display device according to [4] or [5], in which at least one of the first optically anisotropic layer or the second optically anisotropic layer is a film in which a liquid crystal compound is fixed in an aligned state.

[7] The liquid crystal display device according to any one of [1] to [6], in which the optically anisotropic layer is directly adhered to the first polarizer via a polyvinyl alcohol-based adhesive.

[8] The liquid crystal display device according to any one of [1] to [6], in which the optically anisotropic layer is directly adhered to the first polarizer via a curable adhesive composition which is cured by irradiation with active energy rays or heating.

[9] The liquid crystal display device according to any one of [1] to [8], in which an angle formed between, among sides forming an outline of the chevron structure which is a bent structure bent at a central portion, one side forming a bending line passing through the central portion and the absorption axis of the first polarizer or the absorption axis of the second polarizer is larger than 0° and not larger than 5°.

According to the invention, it is possible to provide a liquid crystal display device which suppresses a color change of light leak visually recognized not only from a direction deviated from an absorption axis of a polarizer but also from an oblique direction in all directions, and has high display quality in black display.

DESCRIPTION OF THE PREFERRED EMBODIMENTS

Figure 1:
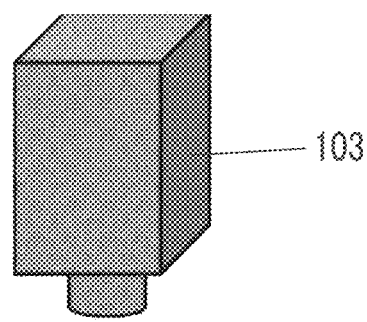
FIG. 1 is a schematic diagram showing a method of measuring a depolarization degree in the invention.
Figure 1:
Figure 1:
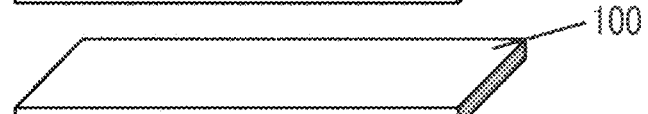
Figure 1:
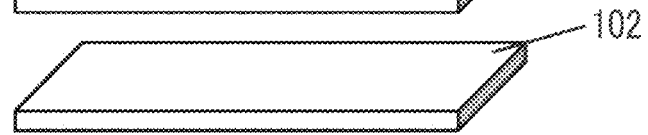
Figure 1:
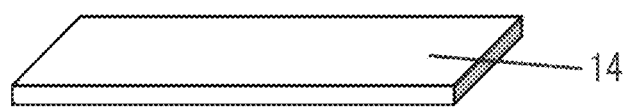

Hereinafter, the invention will be described in detail. In this specification, a numerical range expressed using "to" means a range including numerical values before and after "to" as a lower limit and an upper limit.

In this specification, a polarizing plate refers to a plate in which a protective layer or a functional layer is disposed on at least one surface of a polarizer, and the polarizer and the polarizing plate are separately used.

In this specification, the terms parallel and orthogonal are not used to describe parallel and orthogonal in a strict sense, but include a range of 5° from parallel or orthogonal, respectively.

In this specification, Re ($\lambda$) and Rth ($\lambda$) represent an in-plane retardation and a thickness-direction retardation at a wavelength $\lambda$, respectively. Unless otherwise specified, the wavelength $\lambda$ is 550 nm.

In this specification, Re ($\lambda$) and Rth ($\lambda$) are values measured at the wavelength $\lambda$ using AxoScan OPMF-1 (manufactured by Opto Science, Inc.). By inputting an average refractive index ((nx+ny+nz)/3) and a film thickness (d ($\mu$m)) in AxoScan, Slow Axis Direction (°)

$$Re(\lambda) = R0(\lambda)$$

$$Rth(\lambda) = ((nx+ny)/2 - nz) \times d \text{ is calculated.}$$

In the invention, each of refractive indices nx and ny is a refractive index in an in-plane direction of an optical member, and usually, nx represents a refractive index in a slow axis direction, and ny represents a refractive index in a fast axis direction (that is, a direction orthogonal to the slow axis). nz represents a refractive index in a thickness direction. nx, ny, and nz can be measured using an Abbe's refractometer (NAR-4T, manufactured by Atago Co., Ltd.) and a sodium lamp ($\lambda$=589 nm) as a light source.

In the measurement of wavelength dependence, it can be measured using a multi-wavelength Abbe refractometer DR-M2 (manufactured by Atago Co., Ltd.) in combination with an interference filter.

In addition, the values in Polymer Handbook (JOHN WILEY & SONS, INC) and catalogs of various optical films can also be used.

In this specification, a depolarization degree means a ratio at which emitted light is converted into unpolarized light in a case where linearly polarized light enters an optical member. That is, on the assumption that the depolarization degree is represented by DI, in a case where linearly polarized light having a polarization degree of 1 enters, a polarization degree of the emitted light is (1-DI).

Here, the depolarization degree DI is a dimensionless quantity and is defined for each wavelength of the incident light.

The procedures for measuring the depolarization degree in this specification will be described using FIG. 1.

First, polarizers 101 and 102 are disposed in parallel on both sides of an optical member 100 as a measurement target. In this case, the polarizers 101 and 102 are not in contact with the optical member 100, and each polarizer is provided to be rotated in the polarizer surface by using a stepping motor or the like.

Next, a white plane light source 14 is installed on the side of the polarizer 102 opposite to the optical member 100. As the white plane light source 14, for example, a backlight unit taken out from a commercially available liquid crystal display device or the like can be used.

Next, a spectral luminance meter 103 is installed on the side of the polarizer 101 opposite to the optical member 100. As the spectral luminance meter 103, for example, a spectroradiometer SR-UL2 manufactured by Topcon Technohouse Corporation can be used.

In the arrangement of FIG. 1, the polarizers 101 and 102 are rotated to determine an angle at which the quantity of light transmitted through the optical member 100 and the polarizers 101 and 102 is the smallest. At this time, spectral radiance is measured at each wavelength $\lambda$ and is represented by L_min1 ($\lambda$). Next, the polarizer 101 is rotated to determine an angle at which the quantity of light is the largest, and spectral radiance at this time is represented by L_max1 ($\lambda$). From the obtained measured values, contrast CR1 (λ) at each wavelength λ in the arrangement of FIG. 1 is calculated using Expression (9).

$$CR1(\lambda)=L\_max1(\lambda)/L\_min1(\lambda) \quad \text{Expression (9):}$$

In this specification, the wavelength λ is in a range of 400 nm to 700 nm and is measured in increments of 1 nm.

Next, the optical member 100 is removed from the arrangement of FIG. 1 to form an arrangement formed of the polarizers 101 and 102, and spectral radiance L_min2 (λ) at an angle at which the light quantity is the smallest and spectral radiance L_max2 (λ) at an angle at which the light quantity is the largest are measured in the same manner as in the above description. Next, contrast CR2 (λ) in the arrangement of only the polarizers is calculated using Expression (10).

$$CR2(\lambda)=L\_max2(\lambda)/L\_min2(\lambda) \quad \text{Expression (10):}$$

From the measured values, the depolarization degree DI of the optical member 100 is calculated by Expression (11) at each wavelength λ.

$$DI(\lambda)=2\times(1/CR1(\lambda)-1/CR2(\lambda)) \quad \text{Expression (11):}$$

In the measurement of the depolarization degree of a liquid crystal cell in a visible light region, a liquid crystal cell is used as the optical member 100.

In this specification, the depolarization degree DI is defined at each wavelength λ. An average depolarization degree at wavelengths of 400 nm to 500 nm is represented by DI_blue, and an average depolarization degree at wavelengths of 600 nm to 700 nm is represented by DI_red.

In order to measure the depolarization degree in the visual recognition from an oblique direction, the position and the angle of the spectral luminance meter 103 are adjusted so that the optical member 100 is viewed from the angle, and the measurement is performed in the same manner as in the above description.

Figure 3:
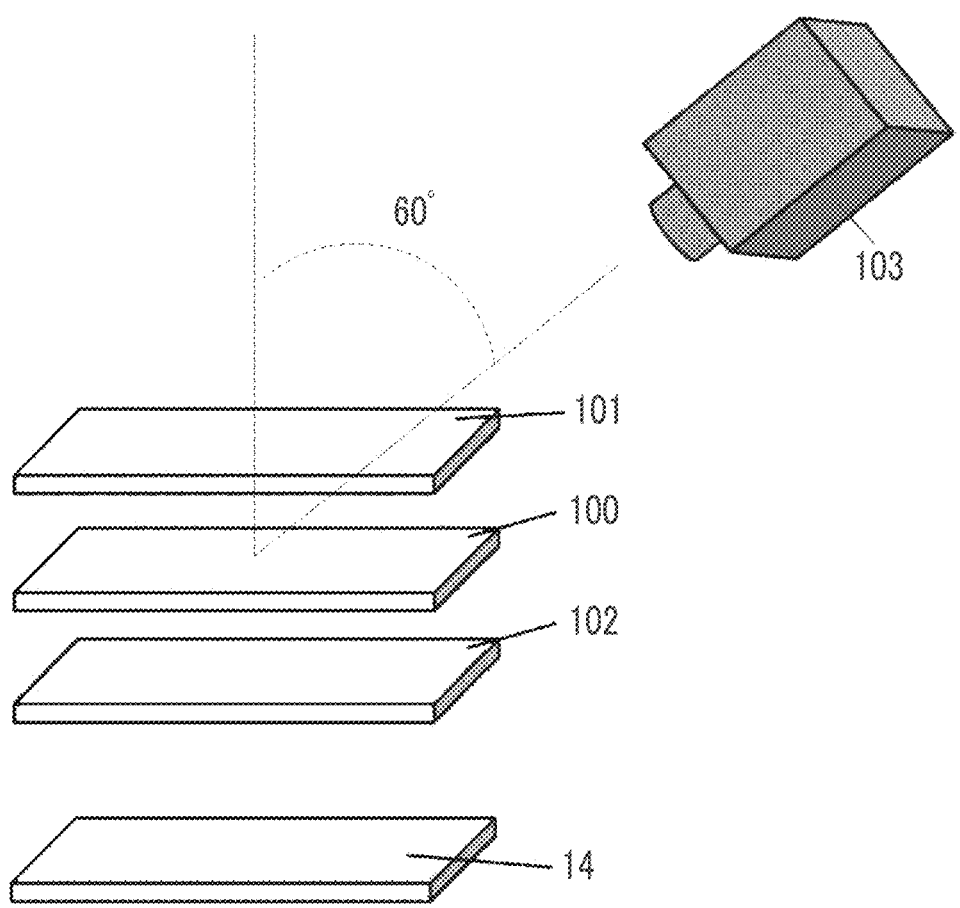
FIG. 3 is a schematic diagram showing a method of measuring a depolarization degree in the invention.

For example, in the measurement of a depolarization degree at an angle of 60° from a normal direction of the optical member 100, the spectral luminance meter 103 is disposed at a position of 60° from the normal direction as shown in FIG. 3, and the measurement is performed in the same manner as in the above description. More specifically, for example, in the measurement of a depolarization degree at an angle of 60° from the normal direction of the liquid crystal cell in a direction of the absorption axis of the polarizer on the viewing side in the liquid crystal display device, the spectral luminance meter 103 in FIG. 3 is positioned with respect to the liquid crystal cell as a measurement target so as to obtain the same positional relationship as that between the liquid crystal cell and the position at an angle of 60° from the normal direction of the liquid crystal cell in the direction of the absorption axis of the polarizer on the viewing side in the liquid crystal display device in a case where the liquid crystal cell is disposed in the liquid crystal display device, and the measurement is performed in the same manner as in the above description.

Hereinafter, an embodiment of the invention will be described with reference to the drawings. A liquid crystal display device shown in FIG. 2 has a first polarizing plate 16 (a protective layer 1 for a first polarizer, a first polarizer 2, a second optically anisotropic layer 4, a first optically anisotropic layer 5), a liquid crystal cell 17 (an upper substrate 7 of the liquid crystal cell, a liquid crystal layer 8, a lower substrate 9 of the liquid crystal cell), a second polarizing plate 18 (a liquid crystal cell-side protective layer 10 for a second polarizer, a second polarizer 11, a backlight-side protective layer 13 for the second polarizer), and a backlight unit 14 provided outside thereof. The liquid crystal cell 17 includes an upper substrate 7, a lower substrate 9, and a liquid crystal layer 8 sandwiched between the substrates.

Figure 2:
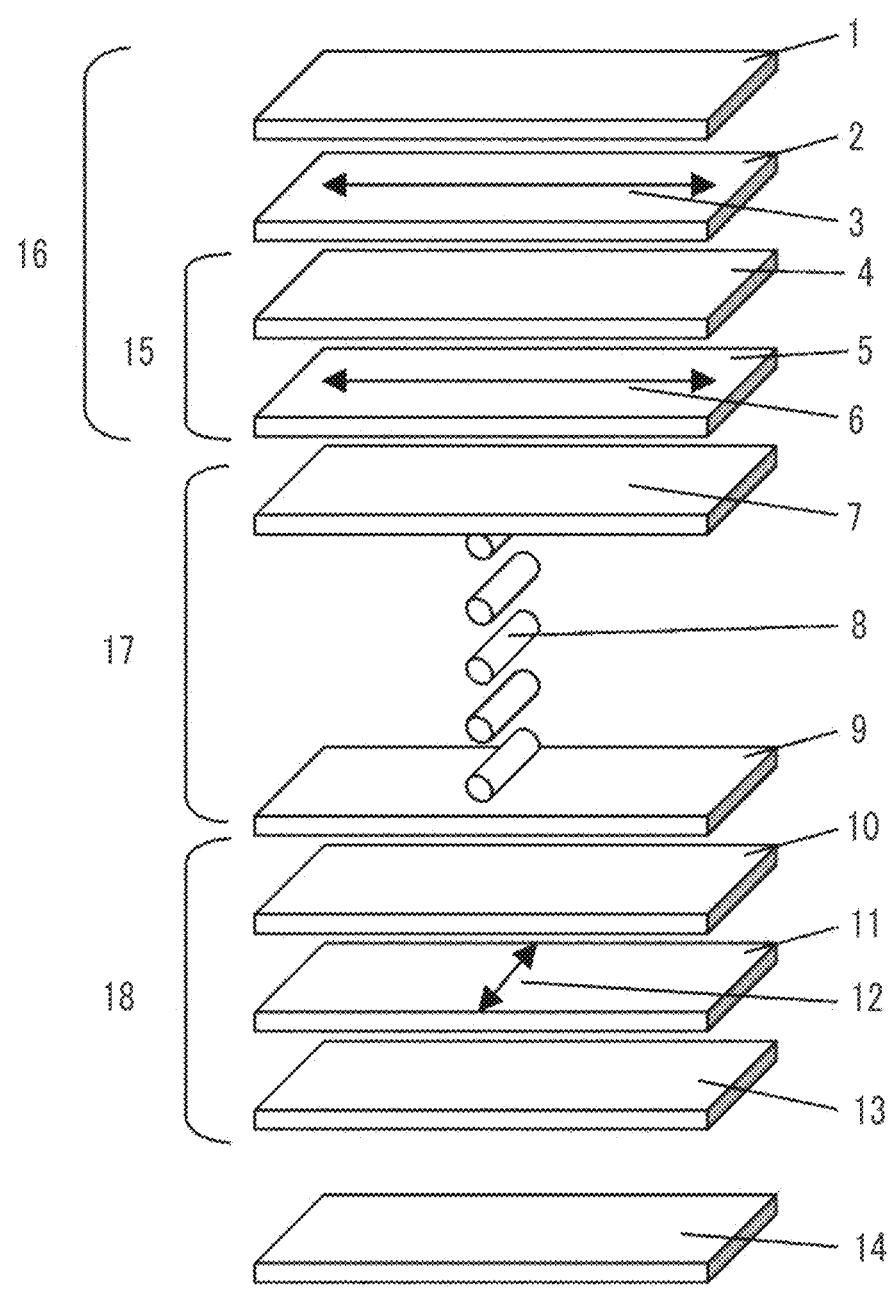
FIG. 2 is a schematic diagram showing an example of a liquid crystal display device according to a first embodiment of the invention.

FIG. 2 is an example of this embodiment, and the same effects of the invention are obtained even in a case where the backlight unit is disposed not on the outside of the second polarizing plate 18, but on the outside of the first polarizing plate 16.

(Protective Layer for Polarizer)

The protective layers 1, 10, and 13 for the polarizers are provided to protect the first polarizer 2 and the second polarizer 11.

The type of the protective layer is not particularly limited, and examples thereof include films such as cellulose acylate, polycarbonate, polysulfone, polyether sulfone, polyacrylate, polymethacrylate, cyclic polyolefin, polyolefin, polyamide, polystyrene, and polyester. Among these, a cellulose acylate film, a cyclic polyolefin film, a polyacrylate film, or a polymethacrylate film is preferable. Commercially available cellulose acetate films (for example, "TD80U" and "Z-TAC" manufactured by Fujifilm Corporation) can also be used.

The first polarizing plate 16 and the second polarizing plate 18 may have a protective layer on only one side or both sides thereof. The protective layer may be in the form of only one layer or a laminate of two or more layers.

The thickness of the protective layer is not particularly limited, but is preferably 80 μm or less, more preferably 40 μm or less, and even more preferably 25 μm or less from the viewpoint of a reduction of the thickness of the liquid crystal display device. The lower limit thereof is not particularly limited, but is preferably 1 μm or more from the viewpoint of a mechanical strength.

(First Polarizer and Second Polarizer)

The types of the first polarizer 2 and the second polarizer 11 are not particularly limited, and known polarizers can be used.

In the invention, it is possible to use a linear polarizer which is commonly used. As the linear polarizer, a polarizer containing a binder and iodine or a dichroic dye, or a coating type polarizer is preferable.

The iodine and the dichroic dye in a linear polarizer exhibit polarization performance by being aligned in the binder. It is preferable that the iodine and the dichroic dye are aligned along the binder molecule or the dichroic dye is aligned in one direction by self organization similarly to a liquid crystal. Recently, commercially available polarizers are typically produced by immersing a stretched polymer in a solution of iodine or a dichroic dye in a bath and allowing the iodine or the dichroic dye to permeate into the binder.

The thicknesses of the first polarizer 2 and the second polarizer 11 are not particularly limited, but are preferably 30 μm or less, more preferably 15 μm or less, and even more preferably 10 μm or less from the viewpoint of a reduction of the thickness of the liquid crystal display device. In particular, from the viewpoint of preventing appearance defects such as cracks and fractures from being generated in the polarizing plate due to differences in dimensional changes between the members during the use of the liquid crystal display device and during a durability test, the thicknesses of the first polarizer 2 and the second polarizer 11 are preferably 10 m or less, more preferably 7 μm or less, and even more preferably 3 m or less. The lower limit of the thicknesses of the first polarizer 2 and the second polarizer 11 is not particularly limited, but is preferably 2 μm or more from the viewpoint of a mechanical strength.

(Optically Anisotropic Layer)

An optically anisotropic layer 15 is a part of members constituting the first polarizing plate 16, and is used for optical compensation of the liquid crystal cell 17. The optically anisotropic layer can also serve as the above-described protective layer. The optically anisotropic layer 15 is formed of one layer or two or more layers, and is preferably formed of one layer or two layers in the invention. In a case where the optically anisotropic layer is formed of two layers, the optically anisotropic layer 15 is a laminate of the first optically anisotropic layer 5 and the second optically anisotropic layer 4. FIG. 2 shows a case where the optically anisotropic layer 15 is formed of two layers.

From the viewpoint of a reduction of the thickness of the liquid crystal display device, the thickness of the optically anisotropic layer 15 is preferably small as long as optical characteristics, mechanical properties, and manufacturing suitability are not impaired, and specifically, the thickness is preferably 1 to 150 µm, more preferably 1 to 70 µm, and even more preferably 1 to 30 µm. In particular, from the viewpoint of preventing appearance defects such as cracks and fractures from being generated in the polarizing plate due to differences in dimensional changes between the members during the use of the liquid crystal display device and during a durability test, the thickness of the optically anisotropic layer 15 is preferably 1 to 7 µm, and more preferably 1 to 5 µm.

The optically anisotropic layer 15 is preferably a polymer film or a film formed using a liquid crystal composition from the viewpoint of ease of manufacturing.

As the polymer film, a cellulose acylate-based film, a cycloolefin-based polymer film (a polymer film formed of a cycloolefin-based polymer), or an acrylic polymer film is preferable. The acrylic polymer film preferably contains an acrylic polymer containing at least one selected from a lactone ring unit, a maleic anhydride unit, or a glutaric anhydride unit.

As the film formed using the liquid crystal composition, films in which a liquid crystal compound is fixed in an aligned state are preferable. Among these, films which are formed by: forming a coating film by applying a composition containing a liquid crystal compound having a polymerizable group; aligning the liquid crystal compound in the coating film; and fixing the alignment of the liquid crystal compound through a curing treatment are more preferable.

Examples of the liquid crystal compound include rod-like liquid crystal compounds and disk-like liquid crystal compounds, which preferably have a polymerizable group for fixing the alignment state.

In a case where the optically anisotropic layer 15 is a film formed using a liquid crystal composition, the film may be formed using an alignment film.

The alignment film generally contains a polymer as a main component. The polymer material for the alignment film is described in many literatures, and many commercial products are available. As the polymer material to be used, polyvinyl alcohol or polyimide and derivatives thereof are preferable. Modified or unmodified polyvinyl alcohol is particularly preferable. Regarding the alignment film which can be used in the invention, the modified polyvinyl alcohols described from the 24th line on page 43 to the 8th line on page 49 of WO01/088574A and in paragraphs [0071] to [0095] of JP3907735B can be referred to. A known rubbing treatment is usually performed on the alignment film.

The thickness of the alignment film is preferably small, but the alignment film is required to have a certain degree of thickness from the viewpoint of providing alignment ability for forming an optically anisotropic layer and of reducing the surface unevenness of the film to form an optically anisotropic layer having a uniform film thickness. Specifically, the thickness of the alignment film is preferably 0.01 to 10 m, more preferably 0.01 to 1 µm, and even more preferably 0.01 to 0.5 µm.

In the invention, a photo-alignment film is also preferably used. The photo-alignment film is not particularly limited, and suitable examples thereof include those described in paragraphs [0024] to [0043] of WO2005/096041A and LPP-JP265CP (trade name) manufactured by Rolic Technologies Ltd.

(In Case where Optically Anisotropic Layer is Formed of One Layer)

In a case where the optically anisotropic layer 15 is formed of one layer, an in-plane retardation Re1 (550) at a wavelength of 550 nm and a thickness-direction retardation Rth1 (550) at a wavelength of 550 nm in the optically anisotropic layer 15 preferably satisfy Expressions (3) and (4).

$$200 \text{ nm} \leq Re1(550) \leq 400 \text{ nm} \qquad \text{Expression (3):}$$

$$-40 \text{ nm} \leq Rth1(550) \leq 40 \text{ nm} \qquad \text{Expression (4):}$$

In addition, the optically anisotropic layer 15 more preferably satisfies Expressions (12) and (13).

$$280 \text{ nm} \leq Re1(550) \leq 320 \text{ nm} \qquad \text{Expression (12):}$$

$$-20 \text{ nm} \leq Rth1(550) \leq 20 \text{ nm} \qquad \text{Expression (13):}$$

In a case where the optically anisotropic layer 15 is formed of one layer, the direction of the slow axis of the optically anisotropic layer 15 is preferably orthogonal to the direction of the absorption axis of the first polarizer.

The optically anisotropic layer 15 formed of one layer is obtained by, for example, stretching a polymer film. Specifically, for example, in a case of a film formed of cellulose acetate benzoate that is cellulose acylate substituted with an aromatic acyl group, a method in which a dope prepared by dissolving cellulose acetate benzoate in a solvent is cast on a metal support for film formation, the solvent is dried to obtain a film, and the obtained film is stretched at a large stretching ratio of about 1.3 to 1.9 times to align cellulose molecular chains can be used.

In addition, for example, a production method in which a shrinkable film is attached to one side or both sides of a polymer film, and heating and stretching are performed as described in JP1993-157911A (JP-H05-157911A), JP2006-072309A, and JP2007-298960A can also be used.

In addition, in the optically anisotropic layer 15, Re1 and Rth1 preferably exhibit reverse wavelength dispersibility.

Here, the reverse wavelength dispersibility means that the larger the wavelength $\lambda$, the larger the Re1 ($\lambda$) and Rth1 ($\lambda$).

(In Case where Optically Anisotropic Layer is Formed of Two Layers)

In a case where the optically anisotropic layer 15 is formed of two layers, the first optically anisotropic layer 5 is preferably a biaxial film (B-plate or positive A-plate) satisfying nx>ny≥nz, and the second optically anisotropic layer 4 is preferably a [quasi] uniaxial film (positive [quasi] C-plate) satisfying nx≈ny<nz.

Specifically, an in-plane retardation Re1 (550) at a wavelength of 550 nm and a thickness-direction retardation Rth1 (550) at a wavelength of 550 nm in the first optically anisotropic layer 5 preferably satisfy Expressions (5) and (6), and an in-plane retardation Re2 (550) at a wavelength of 550 nm and a thickness-direction retardation Rth2 (550) at a wavelength of 550 nm in the second optically anisotropic layer 4 preferably satisfy Expression (7) and (8).

$$80\ nm \leq Re1(550) \leq 200\ nm \quad \text{Expression (5):}$$

$$20\ nm \leq Rth1(550) \leq 150\ nm \quad \text{Expression (6):}$$

$$0\ nm \leq Re2(550) \leq 40\ nm \quad \text{Expression (7):}$$

$$-160\ nm \leq Rth2(550) \leq -40\ nm \quad \text{Expression (8):}$$

In addition, the first optically anisotropic layer 5 more preferably satisfies Expressions (14) and (15), and the second optically anisotropic layer 4 more preferably satisfies Expressions (16) and (17).

$$100\ nm \leq Re1(550) \leq 150\ nm \quad \text{Expression (14):}$$

$$50\ nm \leq Rth1(550) \leq 120\ nm \quad \text{Expression (15):}$$

$$0\ nm \leq Re2(550) \leq 20\ nm \quad \text{Expression (16):}$$

$$-140\ nm \leq Rth2(550) \leq -80\ nm \quad \text{Expression (17):}$$

In this embodiment, the first optically anisotropic layer 5 is disposed on the side of the liquid crystal cell 17, and the second optically anisotropic layer 4 is disposed on the side of the first polarizer 2. The positional relationship between the first optically anisotropic layer and the second optically anisotropic layer may be opposite to that in FIG. 2.

In a case where the optically anisotropic layer 15 is formed of two layers, the direction of the slow axis of the first optically anisotropic layer 5 is preferably parallel to the direction of the absorption axis of the first polarizer.

The first optically anisotropic layer 5 may be a polymer film (for example, a cellulose acylate film, a cyclic polyolefin film, and a polycarbonate film) manufactured by an appropriate method such as a melting film forming method and a solution film forming method. The polymer film is obtained by performing stretching by, for example, a longitudinal stretching method by controlling a circumferential speed of a roll, a cross-direction stretching method by a tenter, a biaxial stretching method, or the like. More specifically, the description in JP2005-338767A can be referred to.

The first optically anisotropic layer 5 may be a polymer formed from a liquid crystal composition containing a liquid crystal compound having a polymerizable group exhibiting biaxiality according to the alignment.

The first optically anisotropic layer 5 may be a layer having a desired phase difference by fixing the alignment state of the liquid crystal compound.

The first optically anisotropic layer 5 is preferably a film in which the liquid crystal compound is fixed in an aligned state, and more preferably a film in which the rod-like liquid crystal compound is fixed in an aligned state in a direction horizontal to the substrate surface.

As the liquid crystal compound, a liquid crystal compound exhibiting reverse wavelength dispersibility is preferable. Examples thereof include a liquid crystal compound exhibiting reverse wavelength dispersibility described in WO2017/043438A.

The thickness f the first optically anisotropic layer 5 is preferably 1 to 80 µm, more preferably 1 to 40 µm, and even more preferably 1 to 25 µm.

The first optically anisotropic layer 5 is preferably a positive A-plate (positive A-plate).

In this specification, the positive A-plate is defined as follows. The positive A-plate satisfies a relationship represented by Expression (18) where nx represents a refractive index of the film in the in-plane slow axis direction (the direction in which the in-plane refractive index is maximized), ny represents a refractive index in a direction orthogonal to the in-plane slow axis in the plane, and nz represents a refractive index in the thickness direction. The positive A-plate shows a positive Rth.

$$nx > ny \approx nz \quad \text{Expression (18):}$$

The symbol "≈" includes not only a case where ny and nz are completely the same, but also a case where ny and nz are substantially the same. Regarding the expression "substantially the same", "ny≈nz" includes, for example, a case where (ny−nz)×d (where d is a film thickness) is −10 to 10 nm, and preferably −5 to 5 nm.

The second optically anisotropic layer 4 may be a polymer film (for example, a cellulose acylate film, a cyclic polyolefin film, and a polycarbonate film). The polymer film can be obtained by a method including: forming a film so that no in-plane retardation is developed; and performing stretching in a thickness (nz) direction using a heat shrinkable film or the like.

The second optically anisotropic layer 4 may be a layer having a desired phase difference by fixing the alignment state of the liquid crystal compound.

The second optically anisotropic layer 4 is preferably a film in which the liquid crystal compound is fixed in an aligned state, and more preferably a film in which the rod-like liquid crystal compound is fixed in an aligned state in a direction perpendicular to the substrate surface.

As the liquid crystal compound, a liquid crystal compound exhibiting reverse wavelength dispersibility is preferable. Examples thereof include a liquid crystal compound exhibiting reverse wavelength dispersibility described in WO2017/043438A.

The thickness of the second optically anisotropic layer is preferably 1 to 80 µm, more preferably 1 to 40 µm, and even more preferably 1 to 25 µm.

The second optically anisotropic layer 4 is preferably a positive C-plate (positive C-plate).

In this specification, the positive C-plate is defined as follows. The positive C-plate satisfies a relationship represented by Expression (19) where nx represents a refractive index of the film in the in-plane slow axis direction (the direction in which the in-plane refractive index is maximized), ny represents a refractive index in a direction orthogonal to the in-plane slow axis in the plane, and nz represents a refractive index in the thickness direction. The positive C-plate shows a negative Rth.

$$nx \approx ny < nz \quad \text{Expression (19):}$$

The symbol "≈" includes not only a case where nx and ny are completely the same, but also a case where nx and ny are substantially the same. Regarding the expression "substantially the same", "nx≈ny" includes, for example, a case where (nx−ny)×d (where d is a film thickness) is −10 to 10 nm, and preferably −5 to 5 nm.

In addition, from the viewpoint of preventing appearance defects such as cracks and fractures from being generated in the polarizing plate due to differences in dimensional changes between the members during the use of the liquid crystal display device and during a durability test, the first optically anisotropic layer 5 and the second optically anisotropic layer 4 are both preferably a film in which the liquid crystal compound is fixed in an aligned state. In a case where the liquid crystal compound is used, the thickness of the optically anisotropic layer 15 is easily set to 7 µm or less.

(First Polarizing Plate)

The first polarizing plate 16 has at least the optically anisotropic layer 15 and the first polarizer 2 described above. On a surface of the first polarizer 2 opposite to the optically anisotropic layer 15, the protective layer 1 may be provided, or a cured resin layer may be disposed. The surface of the first polarizer opposite to the optically anisotropic layer may be directly attached to another member of the liquid crystal display device.

For example, an adhesive can be used to laminate the first polarizer 2, the protective layer 1, and the optically anisotropic layer 15. As the adhesive, an adhesive formed of a polyvinyl alcohol-based resin aqueous solution or a curable adhesive composition which is cured by irradiation with active energy rays or heating is preferable. Examples of the curable adhesive composition include a curable adhesive composition containing a cationic polymerizable compound and a curable adhesive composition containing a radical polymerizable compound.

The thickness of the adhesive layer is preferably 0.01 to 20 m, more preferably 0.01 to 10 μm, and even more preferably 0.05 to 5 μm. In a case where the thickness of the adhesive layer is within the above range, floating or peeling does not occur between the protective layer or the optically anisotropic layer to be laminated and the polarizer, and an adhesive force causing no problems in practical use can be obtained.

The thickness of the first polarizing plate 16 is preferably 100 μm or less, more preferably 50 μm or less, and even more preferably 30 μm or less from the viewpoint of a reduction of the thickness of the liquid crystal display device.

In addition, from the viewpoint of preventing appearance defects such as cracks and fractures from being generated in the polarizing plate due to differences in dimensional changes between the members during the use of the liquid crystal display device and during a durability test, the thicknesses of the first polarizer 2 and the optically anisotropic layer 15 are both preferably 7 μm or less. From the same viewpoint, the linear expansion coefficient and the rate of dimensional change due to moisture of the first polarizer 2 are preferably close to those of the optically anisotropic layer 15 in the same direction. The linear expansion coefficient and the rate of dimensional change due to moisture of the first polarizer are particularly preferably close to those of the optically anisotropic layer in a direction orthogonal to the absorption axis of the first polarizer 2 (that is, a transmission axis direction). Specifically, a difference in the linear expansion coefficient between the first polarizer 2 and the optically anisotropic layer 15 in the direction orthogonal to the absorption axis of the first polarizer 2 is preferably 20 ppm/° C. or less, and more preferably 10 ppm/° C. or less.

In addition, the first polarizing plate 16 preferably has a first polarizer 2 containing a dichroic dye and a liquid crystal compound, and an optically anisotropic layer 15 which is a film in which a liquid crystal compound is fixed in an aligned state. In this case, it is easy to make both the polarizer and the optically anisotropic layer thin, and it is easy to make the linear expansion coefficient and the rate of dimensional change due to moisture of the polarizer close to those of the optically anisotropic layer. The polarizer containing a dichroic dye and a liquid crystal compound can be produced by referring to, for example, JP2018-120229A.

The first polarizing plate 16 may be installed on the viewing side or the backlight side of the liquid crystal cell 17. In any case, the same effects of the invention can be obtained. FIG. 2 shows a case where the first polarizing plate 16 is installed on the viewing side.

The first polarizing plate 16 can be attached to the liquid crystal cell 17 using a pressure sensitive adhesive. From the viewpoint of preventing appearance defects such as cracks and fractures from being generated in the polarizing plate due to differences in dimensional changes between the members during the use of the liquid crystal display device and during a durability test, the thickness of the pressure sensitive adhesive is preferably small. Specifically, the thickness is preferably 20 μm or less. From the same viewpoint, the storage elastic modulus of the pressure sensitive adhesive at 20° C. is preferably 0.5 MPa or more. The storage elastic modulus of the pressure sensitive adhesive at 80° C. is preferably 0.2 MPa or more.

(Second Polarizing Plate)

The second polarizing plate 18 is a polarizing plate disposed on a surface of the liquid crystal cell 17 opposite to the first polarizing plate 16.

The configuration of the second polarizing plate 18 is not particularly limited as long as it includes at least the second polarizer 11. As the second polarizer 11, the polarizer mentioned as an example in the description of the first polarizer 2 can be used, and a suitable range of the thickness thereof is also as described above.

The angle formed between an absorption axis 3 of the first polarizer 2 in the first polarizing plate 16 and an absorption axis 12 of the second polarizer 11 in the second polarizing plate 18 when observed from the normal direction of the surface of the first polarizing plate 16 is preferably 90 degrees.

In addition to the second polarizer 11, a protective layer and the like may be included in the second polarizing plate 18. In particular, in a case where a protective layer is provided on the side of the liquid crystal cell 17, the protective layer is preferably a film having a small retardation. An in-plane retardation Re (550) of the protective layer on the side of the liquid crystal cell 17 is preferably 10 nm or less, more preferably 5 nm or less, and even more preferably 2 nm or less. A film thickness-direction retardation Rth (550) is preferably 10 nm or less, more preferably 5 nm or less, and even more preferably 2 nm or less.

(Liquid Crystal Cell)

The liquid crystal cell 17 of the invention is an in-plane switching mode (IPS mode) or FFS mode liquid crystal cell.

The IPS mode liquid crystal cell is a liquid crystal cell in which a liquid crystal compound (particularly preferably a rod-like liquid crystal compound) in a liquid crystal layer is substantially horizontally aligned in the plane during no voltage application and switching is performed by changing the alignment direction of the liquid crystal compound based on the presence or absence of application of a voltage. Specifically, those described in JP2004-365941A, JP2004-012731A, JP2004-215620A, JP2002-221726A, JP2002-055341A, and JP2003-195333A can be referred to. In these modes, the liquid crystal compound is aligned substantially parallel during black display, and the liquid crystal compound is aligned parallel to surfaces of the upper substrate 7 and the lower substrate 9 in the absence of voltage application to realize black display.

The FFS mode is a mode in which a liquid crystal compound is switched so as to be constantly horizontal to the surface of the substrate similar to the IPS mode, and liquid crystal molecules are switched using a lateral electric field in a direction horizontal to the surface of the substrate. Generally, the FFS mode has a solid electrode and an interlayer insulating film or and a comb-tooth electrode, and the electric field direction thereof is different from that of the IPS mode.

The liquid crystal compound in the liquid crystal layer 8 is ideally aligned horizontal to the surface of the substrate in both white display and black display, but may be aligned by being tilted at a small tilt angle. Generally, in a case where a substrate of a liquid crystal cell is rubbed with a cloth and the liquid crystal layer is aligned, the liquid crystal compound is tilt-aligned at a small tilt angle with respect to the interface of the substrate, and the liquid crystal compound is aligned substantially horizontally in a case where the glass substrate is irradiated with ultraviolet (UV) light to align the liquid crystal layer (photo-alignment). The photo-alignment is preferably used from the viewpoint of suppressing a color change depending on the direction in the visual recognition from an oblique direction during black display.

The slow axis (slow axis during black display) of the liquid crystal compound in the liquid crystal cell and the absorption axis of the second polarizer are preferably disposed in parallel.

The liquid crystal cell 17 may have any configuration as long as at least the liquid crystal layer 8 and the two upper and lower substrates 7 and 9 are disposed so as to sandwich the liquid crystal layer 8 therebetween, and other members may be included. A transparent electrode may be disposed on the surface of at least one of the substrates. As will be described later, a transparent electrode may be disposed as a subpixel electrode on the surface of at least one of the substrates.

The liquid crystal cell may include a color filter layer and a thin film transistor (TFT) layer. The positions of the color filter layer and the TFT layer are not particularly limited, and the layers are generally disposed on the surface of any one of the upper substrate 7 or the lower substrate 9. The color filter layer and the TFT layer are preferably disposed between the upper substrate 7 and the lower substrate 9.

The liquid crystal cell 17 has pixels consisting of at least blue, green, and red subpixels, and has a screen resolution of 250 ppi or more.

The upper limit of the image resolution is not particularly limited, and is 1,000 ppi or less in many cases.

Here, the screen resolution of 250 ppi or more means that 250 or more pixels are included per inch (about 2.54 mm) in length in one side of the liquid crystal cell 17 in the vertical or horizontal direction.

Since the screen resolution is 250 ppi or more, the liquid crystal display device according to the embodiment of the invention has a very high display quality in image display.

A depolarization degree of the liquid crystal cell 17 in a visible light region satisfies Expressions (1) and (2).

$$DI\_blue(\varphi=0°,\theta=60°)/DI\_red(\varphi=0°,\theta=60°)>0.80 \quad \text{Expression (1):}$$

$$DI\_blue(\varphi=90°,\theta=60°)/DI\_red(\varphi=90°,\theta=60°)>0.80 \quad \text{Expression (2):}$$

Here, DI_blue and DI_red represent average depolarization degrees of the liquid crystal cell at wavelengths of 400 to 500 nm and 600 to 700 nm, respectively, and DI ($\varphi=0°$, $\theta=60°$) and DI ($\varphi=90°$, $\theta=60°$) represent depolarization degrees of the liquid crystal cell 17 at an angle of 60° formed from the normal direction of the liquid crystal cell in the absorption axis direction and the transmission axis direction of the polarizer on the viewing side in the liquid crystal display device, respectively.

That is, DI_blue ($\varphi=0°$, $\theta=60°$) represents an average depolarization degree of the liquid crystal cell at wavelengths of 400 to 500 nm at an angle of 60° formed from the normal direction of the liquid crystal cell in the absorption axis direction of the polarizer on the viewing side in the liquid crystal display device, DI_red ($\varphi=0°$, $\theta=60°$) represents an average depolarization degree of the liquid crystal cell at wavelengths of 600 to 700 nm at an angle of 60° formed from the normal direction of the liquid crystal cell in the absorption axis direction of the polarizer on the viewing side in the liquid crystal display device, DI_blue ($\varphi=90°$, $\theta=60°$) represents an average depolarization degree of the liquid crystal cell at wavelengths of 400 to 500 nm at an angle of 60° formed from the normal direction of the liquid crystal cell in the transmission axis direction of the polarizer on the viewing side in the liquid crystal display device, and DI_red ($\varphi=90°$, $\theta=60°$) represents an average depolarization degree of the liquid crystal cell at wavelengths of 600 to 700 nm at an angle of 60° formed from the normal direction of the liquid crystal cell in the transmission axis direction of the polarizer on the viewing side in the liquid crystal display device.

In a case where the depolarization degree of the liquid crystal cell 17 satisfies Expressions (1) and (2), the liquid crystal display device according to the embodiment of the invention suppresses a color change depending on the direction in the visual recognition from an oblique direction during black display. In particular, it is possible to suppress that a color of light leak is visually recognized as a reddish color depending on the direction.

In the visual recognition of black display from an oblique direction, the depolarization degree of the liquid crystal cell 17 in a visible light region preferably satisfies Expression (20) or (21), and more preferably satisfy Expression (22) or (23) from the viewpoint of further suppressing that a color of light leak is visually recognized as a reddish color depending on the direction.

$$DI\_blue(\varphi=0°,\theta=60°)/DI\_red(\varphi=0°,\theta=60°)>1.00 \quad \text{Expression (20):}$$

$$DI\_blue(\varphi=90°,\theta=60°)/DI\_red(\varphi=90°,\theta=60°)>1.00 \quad \text{Expression (21):}$$

$$DI\_blue(\varphi=0°,\theta=60°)/DI\_red(\varphi=0°,\theta=60°)>1.20 \quad \text{Expression (22):}$$

$$DI\_blue(\varphi=90°,\theta=60°)/DI\_red(\varphi=90°,\theta=60)>1.20 \quad \text{Expression (23):}$$

The upper limit of DI_blue ($\varphi=0°$, $\theta=60°$)/DI_red ($\varphi=0°$, $\theta=60°$) is not particularly limited, and is less than 1.50 in many cases.

The upper limit of DI_blue ($\varphi=90°$, $\theta=60°$)/DI_red ($\varphi=90°$, $\theta=60°$) is not particularly limited, and is less than 1.50 in many cases.

Each subpixel of the liquid crystal cell 17 has a chevron structure in which an angle formed between at least one side (preferably a side forming a bending line to be described later) of the structure and the absorption axis of the first polarizer 2 or the absorption axis of the second polarizer 11 is larger than 0° and not larger than 5.

An IPS mode or FFS mode liquid crystal cell generally has a chevron structure having a side whose angle formed with respect to the absorption axis of the polarizer is larger than 5°. Accordingly, the direction in which the alignment direction of the liquid crystal compound is rotated during voltage application is restricted, and it is possible to suppress a color change visually recognized from an oblique direction during white display.

According to the study by the inventors, it has been found that in a case where the angle formed between at least one side (preferably a side forming a bending line to be described later) of the chevron structure and the absorption axis of the polarizer is larger than 5°, the depolarization degree of the liquid crystal cell in an oblique direction is significantly changed depending on the direction, and a color change depending on the direction in the visual recognition from an oblique direction during black display is increased. The inventors have presumed that a cause thereof is that in a case where the angle formed between at least one side of the chevron structure and the absorption axis of the polarizer is large, the fluctuation in the alignment direction of the liquid crystal compound at an end portion of the pixel increases, and thus the depolarization degree is increased in the alignment direction of the liquid crystal compound. Therefore, as described above, the angle formed between at least one side of the chevron structure of each subpixel and the absorption axis of the polarizer is preferably larger than 0° and not larger than 5°.

Figure 4:
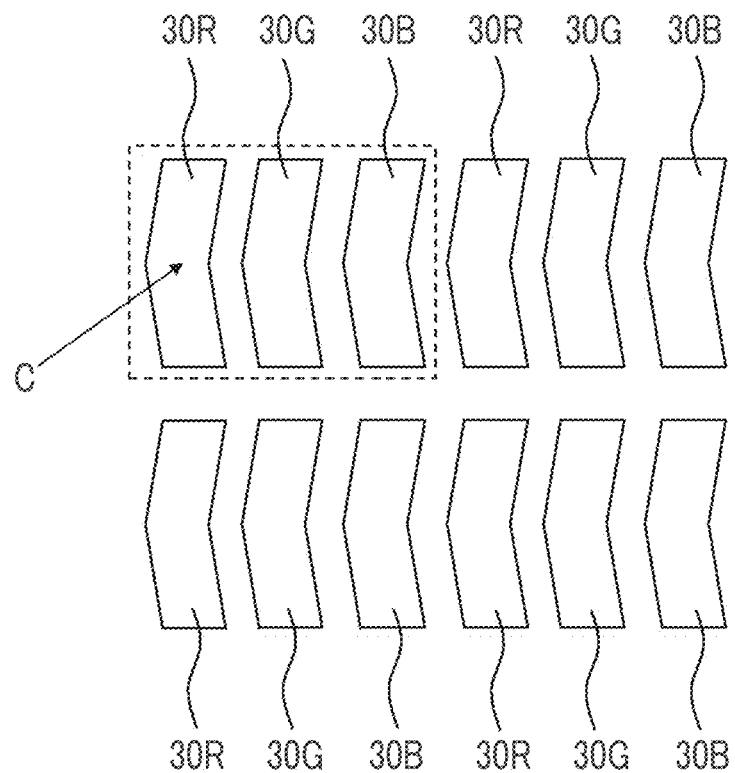
FIG. 4 is a diagram for explaining subpixels in a liquid crystal cell.

FIG. 4 shows a schematic diagram of an embodiment of the subpixels of the liquid crystal cell 17. As shown in FIG. 4, one pixel of the liquid crystal cell is formed of a red subpixel 30R, a green subpixel 30G, and a blue subpixel 30B as surrounded by a broken line.

The red subpixel corresponds to a subpixel in which a red color filter layer (hereinafter, also referred to as "RCF") is disposed, the green subpixel corresponds to a subpixel in which a green color filter layer (hereinafter, also referred to as "GCF") is disposed, and the blue subpixel corresponds to a subpixel in which a blue color filter layer (hereinafter, also referred to as "BCF") is disposed. That is, each color subpixel includes a color filter layer corresponding to each color.

BCF is a color filter layer exhibiting a maximum transmittance in a blue region (wavelength 420 to 490 nm), GCF is a color filter layer exhibiting a maximum transmittance in a green region (wavelength 495 to 570 nm), and RCF is a color filter layer exhibiting a maximum transmittance in a blue region (wavelength 580 to 700 nm).

In FIG. 4, a black matrix is disposed in many cases in a region other than the red subpixel 30R, the green subpixel 30G, and the blue subpixel 30B.

In FIG. 4, the pixel is formed of the red subpixel 30R, the green subpixel 30G, and the blue subpixel 30B, but subpixels of other colors may be further included.

As shown in FIG. 4, each subpixel (red subpixel 30R, green subpixel 300, and blue subpixel 30B) has a so-called chevron structure.

The subpixel having a chevron structure means that an electrode (subpixel electrode) for applying an electric field to the subpixel portion has a chevron structure. The subpixel electrode is disposed on at least one of the pair of substrates which are opposed to each other and included in the liquid crystal cell. The subpixel electrode is preferably a transparent electrode.

As shown in FIG. 4, the shape of the color filter layer included in the subpixel is also preferably a chevron structure corresponding to the subpixel electrode.

Figure 5:
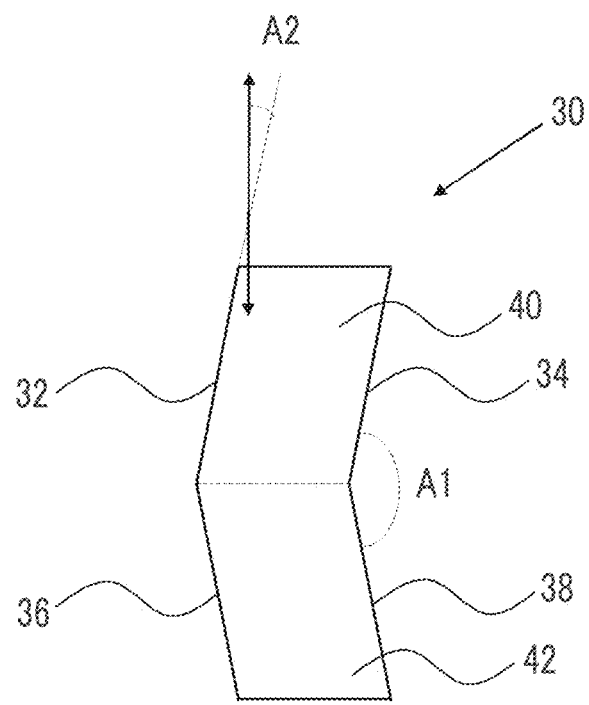
FIG. 5 is a diagram for explaining a shape of a subpixel.

The chevron structure is as shown in FIG. 4, a structure bent in a "V" shape (a bent structure). In other words, the chevron structure is a subpixel having a bent structure bent at a central portion (C) as shown in FIG. 4. More specifically, as shown in FIG. 5, the subpixel 30 (red subpixel 30R, green subpixel 30G, and blue subpixel 30B) has a bent structure formed by joining a parallelogram-like first portion 40 to a parallelogram-like second portion 42 having the same structure (congruence) as the first portion 40 so as to share one side of the same length with each other. In other words, the subpixel 30 has a structure in which an angle (angle A1 in the drawing) formed between the side (sides 32 and 34 in FIG. 5) which is not parallel to the one side of the first portion 40 shared with the second portion 42 and the side (sides 36 and 38 in FIG. 5) which is not parallel to the one side of the second portion 42 shared with the first portion 41 is less than 180. The size (bending angle) of the angle A1 of the subpixel 30 is not particularly limited, but is preferably 170° to less than 180°.

The parallelogram shape may be provided so that the entire shape thereof is a substantially parallelogram shape, and a part (for example, one angular portion of the parallelogram) of the shape may have a chip or a convex portion. The parallelogram shape does not include a rectangular shape and a square shape in which all four angles are equal.

As shown in FIG. 4, the subpixels are arranged adjacent to each other in the liquid crystal cell 17. That is, the subpixels are arranged so that among the sides forming the outline of the chevron structure, the sides forming the bending lines (the line formed by the sides 32 and 36 and the line formed by the sides 34 and 38 in FIG. 5) are parallel to each other. The bending line passes through the central portion of the chevron structure which is a bent structure bent at the central portion thereof.

More specifically, the subpixels are arranged so that the side (sides 32 and 34 in FIG. 5) which is not parallel to the one side of the first portion 40 shared with the second portion 42 in the subpixel 30 shown in FIG. 5 and the side (sides 36 and 38 in FIG. 5) which is not parallel to the one side of the second portion 42 shared with the first portion 41 are parallel between the subpixels.

As described above, each subpixel of the liquid crystal cell 17 have a chevron structure in which an angle formed between at least one side (preferably a side forming a bending line to be described later) of the structure and the absorption axis of the first polarizer 2 or the absorption axis of the second polarizer 11 is larger than 0° and not larger than 5°.

Details of the structure will be described using FIG. 5. The black arrow extending in the vertical direction in FIG. 5 represents the absorption axis of the polarizer. In the invention, an angle formed between, among the sides forming the outline of the chevron structure, the side (sides 32, 34, 36, and 38 in FIG. 5) forming the bending line (the line formed by the sides 32 and 36 and the line formed by the sides 34 and 38 in FIG. 5) and the absorption axis of the polarizer is preferably larger than 0° and not larger than 5. More specifically, an angle (angle A2 in FIG. 5) formed between the side (sides 32 and 34 in FIG. 5) which is not parallel to the one side of the first portion 40 shared with the second portion 42 in the subpixel 30 shown in FIG. 5 or the side (sides 36 and 38 in FIG. 5) which is not parallel to the one side of the second portion 42 shared with the first portion 41 and the absorption axis of the polarizer is preferably larger than 0° and not larger than 5°.

An angle formed between the absorption axis of the polarizer disposed on the backlight side out of the two polarizers in the liquid crystal display device and the side forming the bending line is preferably larger than 0° and not larger than 5°.

In addition, according to the study by the inventors, it has been found that similar to the chevron structure of the subpixel, a structure of a spacer in the color filter layer can also be a cause of a color change depending on the direction in the visual recognition from an oblique direction during black display. Specifically, it has been presumed that, for example, in a case where the spacer is present only in a red subpixel region, the fluctuation in the alignment direction of the liquid crystal compound of the liquid crystal layer may increase only by the red subpixel, and thus the depolarization degree of red may be increased in the alignment direction of the liquid crystal compound.

Here, the spacer is a column member provided to maintain a constant distance between the two substrates in the liquid crystal cell. The spacer is usually formed on the black matrix of the color filter layer, and a part thereof may be present in the subpixel region according to the size of the spacer.

Due to the above reasons, the spacer in the color filter layer is ideally not present in the red, green, and blue subpixel regions, and in a case where the spacer is present in the subpixel region, the spacer is preferably present in all color subpixel regions with equal area ratios, or at least in the red subpixel region and the blue subpixel region with equal area ratios.

According to the study by the inventors, the depolarization degree of the liquid crystal cell 17 can be changed not only by adjusting the angle of the chevron structure and the position of the spacer, but also by, for example, adjusting the depolarization degree of the color filter layer. Specifically, Expressions (1) and (2) can be satisfied by increasing the depolarization degree of the blue pixel region of the color filter relative to the depolarization degree of the red region. The depolarization degree of the color filter layer can be increased by imparting a slight scattering property to the color filter layer. For example, in a case where a pigment-based color material is used for the color filter layer, the depolarization degree can be increased as compared with a case where a dye-based color material is used.

According to the study by the inventors, the depolarization degree of the liquid crystal cell 17 can be changed by adjusting Δnd of the liquid crystal layer 8. Specifically, it has been found that in a case where Δnd of the liquid crystal layer 8 at a wavelength of 550 nm is adjusted to be less than 360 nm, DI_blue tends to be relatively larger than DI_red. Δnd of the liquid crystal layer 8 is preferably 330 nm or less, and more preferably 300 nm or less.

EXAMPLES

Hereinafter, the invention will be described in detail based on examples. Materials, reagents, substance amounts and ratios thereof, operations, and the like shown in the following examples are able to be properly changed without departing from the intent of the invention. Therefore, the invention is not limited to the following examples.

<Production of IPS Mode Liquid Crystal Cell>

An IPS mode liquid crystal cell having a liquid crystal layer between two glass substrates was produced. In the formation of the liquid crystal cell, a glass substrate was subjected to a photo-alignment treatment with reference to Example 11 of JP2005-351924A to form an alignment layer, and a liquid crystal compound in the liquid crystal cell was aligned. A tilt angle of the liquid crystal compound with respect to a substrate surface was 0.1°. Δn of the liquid crystal compound in the liquid crystal layer was 0.08625 at a wavelength of 550 nm, and Δnd was adjusted by adjusting an interval (gap; d) between the substrates. In addition, a color filter layer having pixels each formed of blue, green, and red subpixels was formed on the substrate of the liquid crystal cell on the viewing side. In the formation of the color filter layer, liquid crystal cells 171 and 172 in which the color filter layer in the green and red subpixels had a pigment-based color material, and the blue subpixel had a dye-based color material were produced with reference to JP2010-044285A. In addition, a liquid crystal cell 173 in which the color filter layer in the red subpixel had a color material containing a yellow dye, and the green and blue subpixels had a pigment-based color material was produced with reference to JP2015-068852A. The screen resolution of the liquid crystal cells 171 to 173 was 260 ppi, and the shape (the shapes of the subpixel electrode and the color filter layer) of each subpixel had a chevron structure shown in FIGS. 4 and 5. In addition, in <Production of Liquid Crystal Display Device> to be described later, the liquid crystal cell and the polarizer on the viewing side were attached so that an angle formed between one side forming the chevron structure and the absorption axis direction of the second polarizer was 4°. More specifically, an angle formed between, among the sides forming the outline of the chevron structure, the side forming a bending line and the absorption axis direction of the second polarizer (polarizer on the backlight side) was 4°. In other words, each subpixel had the shape shown in FIGS. 4 and 5, and an angle (angle A2 in FIG. 5) formed between the side (sides 32 and 34 in FIG. 5) which was not parallel to the one side of the first portion shared with the second portion in the subpixel or the side (sides 36 and 38 in FIG. 5) which was not parallel to the one side of the second portion shared with the first portion and the absorption axis of the second polarizer as shown in FIG. 5 was 4°.

Next, a tablet terminal iPad (registered trademark) (9.7 inches) manufactured by Apple Inc. was disassembled to take out a liquid crystal panel, and polarizing plates on both sides were peeled. The liquid crystal cell thus obtained was used as a liquid crystal cell 174.

The primary characteristics of the liquid crystal cells 171 to 174 are as shown in Table 1.

TABLE 1

| | | Color Filter Layer | | | | | | |
|---|---|---|---|---|---|---|---|---|
| | | Chevron Structure | | | | | Depolarization Degree | |
| | | Angle Formed from Absorption Axis of Second | Color Material | | | Liquid Crystal Layer | DI_blue (φ = 0°, θ = 60°)/ DI_red (φ = 0°, | DI_blue (φ = 90°, θ = 60°)/ DI_red (φ = 90°, |
| | Resolution | Polarizer | Red | Green | Blue | Δnd | θ = 60°) | θ = 60°) |
| Liquid Crystal Cell 171 | 260 ppi | 4° | Pigment-Based | Pigment-Based | Dye-Based | 360 nm | 0.89 | 0.81 |
| Liquid Crystal Cell 172 | 260 ppi | 4° | Pigment-Based | Pigment-Based | Dye-Based | 300 nm | 1.14 | 1.01 |

TABLE 1-continued

| | | Color Filter Layer | | | | Depolarization Degree | |
|---|---|---|---|---|---|---|---|
| | Chevron Structure | | | | | | |
| | | Angle Formed from Absorption Axis of Second | Color Material | | | Liquid Crystal Layer | DI_blue (φ = 0°, θ = 60°)/ DI_red (φ = 0°, θ = 60°) | DI_blue (φ = 90°, θ = 60°)/ DI_red (φ = 90°, θ = 60°) |
| | Resolution | Polarizer | Red | Green | Blue | And | | |
| Liquid Crystal Cell 173 | 260 ppi | 4° | Dye-Based | Pigment-Based | Pigment-Based | 300 nm | 1.55 | 1.03 |
| Liquid Crystal Cell 174 | 264 ppi | 10° | Unknown | Unknown | Unknown | 360 nm | 0.87 | 0.59 |

<Production of Optically Anisotropic Layer 151 (Two-Layer Configuration)>

8.4 parts by mass of the following copolymer C3 and 0.3 parts by mass of the following thermal acid generator D1 were added to butyl acetate/methyl ethyl ketone (80 parts by mass/20 parts by mass), and a coating liquid 1 for a photo-alignment film was prepared.

Copolymer C3 (weight-average molecular weight: 40,000) (hereinafter, compound)

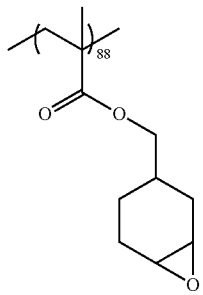

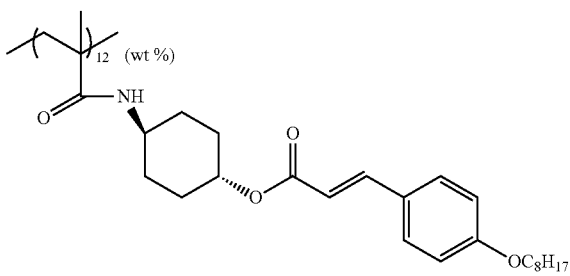

Thermal Acid Generator D1 (hereinafter, compound)

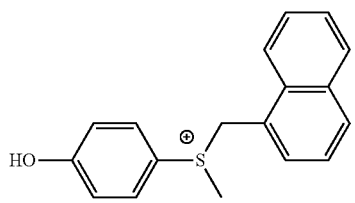

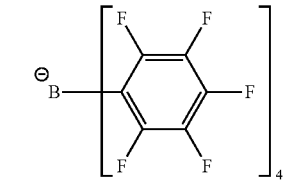

The coating liquid 1 for a photo-alignment film prepared as above was applied to one surface of a protective film by a bar coater. After coating, the solvent was removed by drying on a hot plate at 80° C. for 5 minutes, and a photo-isomerization composition layer having a thickness of 0.2 μm was formed. The photo-isomerization composition layer thus obtained was irradiated with polarized ultraviolet rays (10 mJ/cm², using an extra high pressure mercury lamp) to form a photo-alignment film.

A liquid crystal layer forming composition 1 having the following composition was prepared.

| Liquid Crystal Layer Forming Composition 1 | |
|---|---|
| Following Liquid Crystal Compound R2 | 42.00 parts by mass |
| Following Liquid Crystal Compound R3 | 42.00 parts by mass |
| Following Polymerizable Compound B2 | 16.00 parts by mass |
| Following Polymerization Initiator P3 | 0.50 parts by mass |
| Following Surfactant S3 | 0.15 parts by mass |
| HISOLVE MTEM (manufactured by Toho Chemical Industry Co., Ltd.) | 2.00 parts by mass |

| Liquid Crystal Layer Forming Composition 1 | |
|---|---|
| NK Ester A-200 (manufactured by Shin-Nakamura Chemical Co., Ltd.) | 1.00 part by mass |
| Methyl Ethyl Ketone | 424.8 parts by mass |

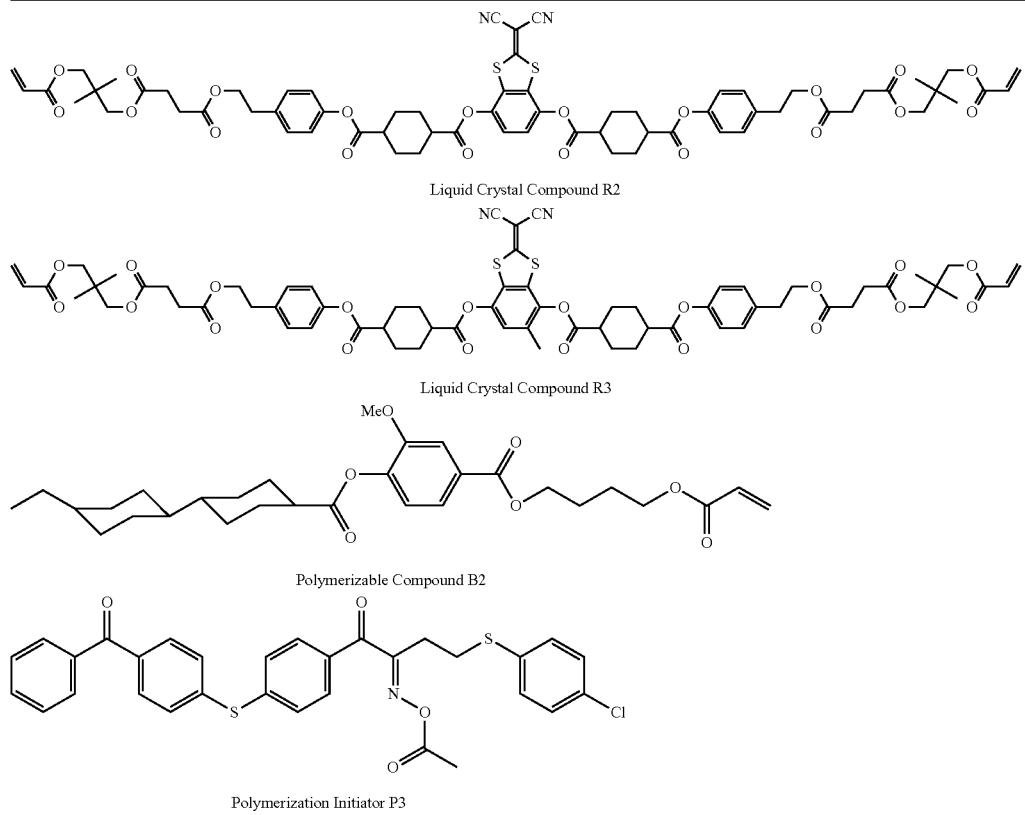

Liquid Crystal Compound R2

Liquid Crystal Compound R3

Polymerizable Compound B2

Polymerization Initiator P3

Surfactant S3 (in the formula, a, b, and c represent a/b/c=66/26/8 (mol % of each repeating unit), respectively)

Next, the liquid crystal layer forming composition 1 prepared as above was applied to the photo-alignment film by a bar coater to form a composition layer. The composition layer thus formed was heated to 110° C. on a hot plate, and then cooled to 60° C. to stabilize the alignment. Then, the temperature was kept at 60° C., and the alignment was fixed by ultraviolet irradiation (500 mJ/cm², using an extra high pressure mercury lamp) under a nitrogen atmosphere (oxygen concentration: 100 ppm) to produce a first optically anisotropic layer having a thickness of 2 μm. Regarding the in-plane retardation of the obtained first optically anisotropic layer, Re (550) was 140 nm and Rth (550) was 70 nm. Re (450)/Re (550) was 0.86, and reverse wavelength dispersibility was exhibited.

A surface on the coating side of the first optically anisotropic layer produced as above was subjected to a corona treatment at a discharge amount of 150 W·min/m², and using the following liquid crystal layer forming composition 2, a second optically anisotropic layer was produced on the first optically anisotropic layer according to the same procedures as described above to obtain an optically anisotropic layer 151. The thickness of the second optically anisotropic layer was adjusted so that a thickness-direction retardation was Rth (550)=−110 nm. Rth (450)/Rth (550) of the second optically anisotropic layer was 0.95, and reverse wavelength dispersibility was exhibited. Re (550) of the second optically anisotropic layer was 0 nm.

| Liquid Crystal Layer Forming Composition 2 | |
|---|---|
| Following Liquid Crystal Compound R1 | 50.0 parts by mass |
| Following Liquid Crystal Compound R2 | 33.3 parts by mass |
| Following Liquid Crystal Compound R3 | 16.7 parts by mass |
| Following Compound B1 | 1.5 parts by mass |
| Following Monomer K1 | 4.0 parts by mass |
| Following Polymerization Initiator P1 | 5.0 parts by mass |
| Following Polymerization Initiator P2 | 2.0 parts by mass |
| Following Surfactant S1 | 0.4 parts by mass |
| Following Surfactant S2 | 0.5 parts by mass |
| Acetone | 200.0 parts by mass |
| Propylene Glycol Monomethyl Ether Acetate | 50.0 parts by mass |

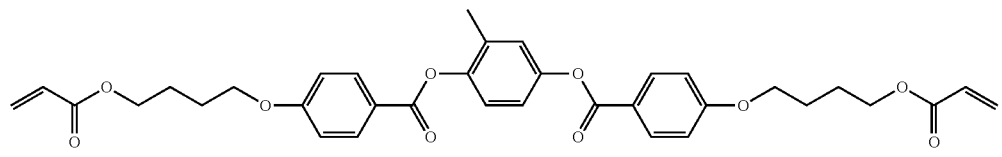

(RA)

Liquid Crystal Compound R1
Mixture of Following Liquid Crystal Compounds (RA), (RB), and (RC) of 83:15:2
(mass ratio)

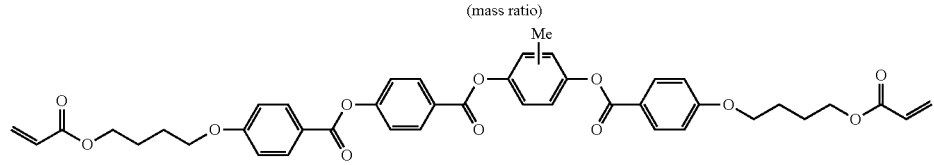

(RB)

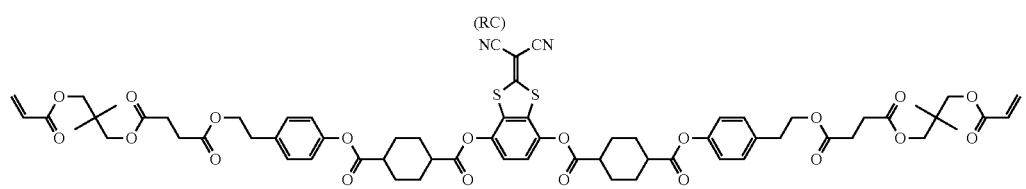

(RC)

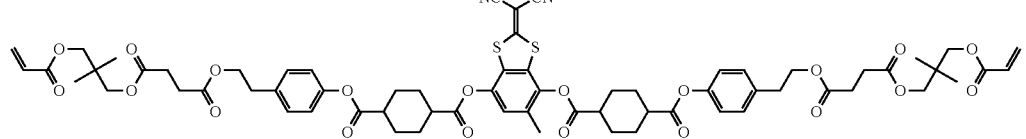

Liquid Crystal Compound R2

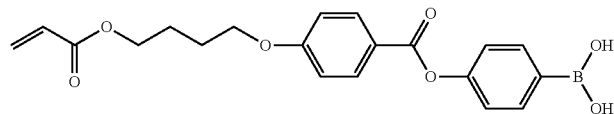

Liquid Crystal Compound R3

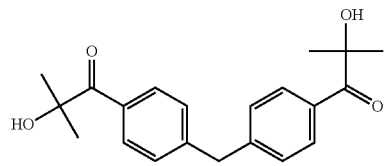

Compound B1

Monomer K1: A-TMMT (Shin-Nakamura Chemical Co., Ltd.)
Polymerization Initiator P1

Liquid Crystal Layer Forming Composition 2

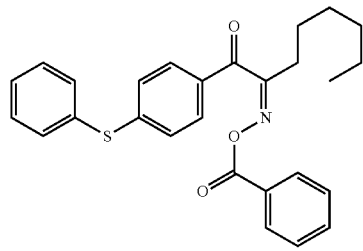

Polymerization Initiator P2

Surfactant S1 (Mw: 15 k, the numerical value on the right side of the parenthesis in each repeating unit represents the mass % of each repeating unit with respect to all the repeating units).

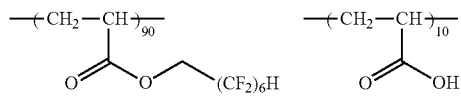

Surfactant S2 (weight-average molecular weight: 11,200) (the numerical value on the right side of the parenthesis in each repeating unit represents the mol % of each repeating unit with respect to all the repeating units).

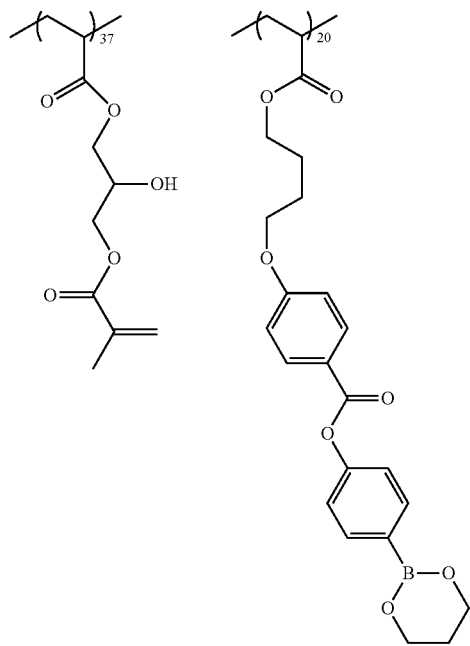

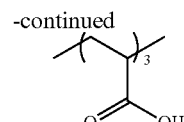

-continued

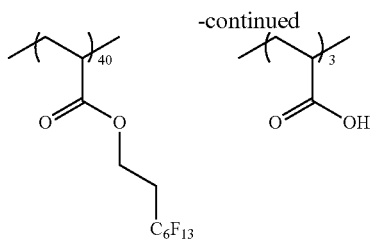

The linear expansion coefficient of the optically anisotropic layer 151 in a direction (that is, a fast axis direction) orthogonal to the slow axis of the first optically anisotropic layer was measured using a thermal analysis device TMA/SS6100 manufactured by Hitachi High-Tech Corporation, and was 38 ppm/° C.

<Production of Optically Anisotropic Layer 152 (Single Layer Configuration)>

The film thickness of the sample shown in Example 1 of JP2006-072309A was adjusted to produce an optically anisotropic layer 152.

The phase difference of the optically anisotropic layer 152 was measured by AxoScan, and the results were as follows: Re (550)=280 nm; Rth (550)=0 nm; Re (450)/Re (550)=1.00; and Re (550)/Re (650)=1.00.

The linear expansion coefficient of the optically anisotropic layer 152 in a slow axis direction was 73 ppm/° C.

<Production of First Polarizing Plate 161>

A cellulose acetate film "TD80U" manufactured by Fujifilm Corporation was immersed in a 2.3 mol/L sodium hydroxide aqueous solution at 55° C. for 3 minutes. Next, the obtained film was washed in a water-washing bath at room temperature and neutralized using a 0.05 mol/L sulfuric acid at 30° C. The obtained film was washed again in the water-washing bath at room temperature, dried with warm air at 100° C., and saponified.

The TD80U saponified according to the above procedures, the polyvinyl alcohol-based polarizer, and the optically anisotropic layer 151 were attached using an adhesive so that the absorption axis of the polarizer and the slow axis of the optically anisotropic layer 151 were parallel to each other. In this case, the optically anisotropic layer 151 was attached so that the second optically anisotropic layer side was the polarizer side. As the adhesive, a 3% aqueous solution of PVA (manufactured by Kuraray Co., Ltd., PVA-117H) was used. Next, Z-TAC used as a support of the optically anisotropic layer 151 was peeled to produce a first polarizing plate 161.

The thickness of the polyvinyl alcohol-based polarizer used was 24 μm, and the linear expansion coefficient in a direction orthogonal to the absorption axis was 50 ppm/° C. That is, a difference in the linear expansion coefficient between the polarizer and the optically anisotropic layer 151 in the direction orthogonal to the absorption axis was 12 ppm/° C.

<Production of First Polarizing Plate 162>

TD80U saponified according to the same procedures as described above, the polyvinyl alcohol-based polarizer, and the optically anisotropic layer 152 were attached using an adhesive so that the absorption axis of the polarizer and the slow axis of the optically anisotropic layer 152 were orthogonal to each other. As the adhesive, a 3% aqueous solution of PVA (manufactured by Kuraray Co., Ltd., PVA-117H) was used. In this manner, a first polarizing plate 162 was produced.

The thickness of the polyvinyl alcohol-based polarizer used was 24 μm, and the linear expansion coefficient in a direction orthogonal to the absorption axis was 50 ppm/° C. That is, a difference in the linear expansion coefficient between the polarizer and the optically anisotropic layer 152 in the direction orthogonal to the absorption axis was 23 ppm/° C.

<Production of First Polarizing Plate 163>

A first polarizing plate 163 was produced in the same manner as in the case of the first polarizing plate 161, except that a polyvinyl alcohol-based polarizer having a thickness of 7 m was used. The linear expansion coefficient in a direction orthogonal to the absorption axis of the polyvinyl alcohol-based polarizer having a thickness of 7 μm was 46 ppm/° C. That is, a difference in the linear expansion coefficient between the polarizer and the optically anisotropic layer 151 in the direction orthogonal to the absorption axis was 8 ppm/° C.

<Production of Second Polarizing Plate 181>

TD80U saponified according to the same procedures as described above, the polyvinyl alcohol-based polarizer, and Z-TAC saponified according to the same procedures as described above were attached in the same manner to produce a second polarizing plate 181.

The thickness of the polyvinyl alcohol-based polarizer used was 24 μm, and the linear expansion coefficient in a direction orthogonal to the absorption axis was 50 ppm/° C.

<Production of Liquid Crystal Display Device>

The first polarizing plate and the second polarizing plate were attached to both sides of the produced liquid crystal cell, respectively, using a pressure sensitive adhesive sheet SK2057 manufactured by Soken Chemical & Engineering Co., Ltd. In this case, the first polarizing plate was attached so that the optically anisotropic layer was on the liquid crystal cell side, and the second polarizing plate was attached so that the Z-TAC was on the liquid crystal cell side. In addition, the attachment was performed so that the slow axis (slow axis during black display) of the liquid crystal compound in the liquid crystal cell and the absorption axis of the second polarizer were parallel to each other. The angle formed between the absorption axis of the first polarizer in the first polarizing plate and the absorption axis of the second polarizer in the second polarizing plate was 90 degrees.

The storage elastic modulus of the pressure sensitive adhesive sheet SK2057 was measured using a dynamic viscoelasticity measuring device DVA-220 manufactured by IT KEISOKU SEIGYO K.K. The storage elastic modulus was 0.45 MPa at 20° C., and 0.18 MPa at 80° C.

Next, a display of a display-integrated computer iMac manufactured by Apple Inc. was disassembled, and on the backlight taken out, the produced liquid crystal cell was installed so that the first polarizing plate side was the viewing side. In this manner, liquid crystal display devices of Examples 1 to 7 and Comparative Example 1 shown in Table 2 were produced.

In addition, liquid crystal display devices of Examples 8 and 9 were produced in the same manner as in the above description, except that the pressure sensitive adhesive sheet was changed to SK1478.

The storage elastic modulus of the pressure sensitive adhesive sheet SK2057 was 0.79 MPa at 20° C., and 0.35 MPa at 80° C.

Next, a liquid crystal display device of Comparative Example 2 was produced in the same manner as in other examples, except that the second polarizing plate 181 (that is, a polarizing plate having no optically anisotropic layer) was attached to both sides of the liquid crystal cell 173.

<Evaluation of Liquid Crystal Display Device>

The produced liquid crystal display devices of the examples and the comparative examples were installed in a dark room, and the backlight was turned on in the absence of voltage application (that is, a black display state). The light leak of the liquid crystal display device in this state was measured using a spectral luminance meter SR-UL2 manufactured by Topcon Technohouse Corporation. In this case, the measurement by the spectral luminance meter was performed while adjusting the position and the angle so that an angle of 60° was formed from the vertical direction of the liquid crystal cell and an azimuthal angle was changed in increments of 15° in a range of 0° to 180° with respect to the direction of the absorption axis of the polarizer on the viewing side. From the obtained measured values, chromaticities u' and v' in the CIELUV color space of the light leak were calculated. Next, in all the measured azimuthal angles, a set of azimuthal angles in which a u' difference Δu' was maximized was determined, and the magnitude of Δu' at that time, that is, Δu'_max was defined as an index of the color change depending on the direction in the visual recognition from an oblique direction.

In a case where Δu'_max was 0.010 or less, good viewing angle characteristics were obtained, and in a case where Δu'_max was 0.005 or less, very good viewing angle characteristics were obtained.

The durability of the liquid crystal display devices of the examples and the comparative examples was evaluated by a heat cycle test in which −35° C. and 70° C. were alternately repeated every 30 minutes. The appearance of the polarizing plate on the viewing side was visually confirmed at the time when 300 cycles were repeated, and evaluation was performed according to the following criteria. The evaluation results of the examples and the comparative examples are shown in the column of "Evaluation" of Table 2.

<Evaluation Criteria>

A: No cracks or fractures occur over the front surface of the polarizing plate.

B: Cracks or fractures occur only at an end portion of the polarizing plate.

C: Cracks or fractures extending to the central portion of the polarizing plate occur at one place.

D: Cracks or fractures extending to the central portion of the polarizing plate occur at a plurality of places.

TABLE 2

| | Polarizing Plate on Viewing Side | Polarizing Plate on Backlight Side | Liquid Crystal Cell | Pressure Sensitive Adhesive Sheet | Δu'_max | Evaluation |
|---|---|---|---|---|---|---|
| Example 1 | First Polarizing Plate 161 | Second Polarizing Plate 181 | Liquid Crystal Cell 171 | SK2057 | 0.007 | C |
| Example 2 | First Polarizing Plate 161 | Second Polarizing Plate 181 | Liquid Crystal Cell 172 | SK2057 | 0.005 | C |
| Example 3 | First Polarizing Plate 161 | Second Polarizing Plate 181 | Liquid Crystal Cell 173 | SK2057 | 0.003 | C |
| Example 4 | First Polarizing Plate 162 | Second Polarizing Plate 181 | Liquid Crystal Cell 171 | SK2057 | 0.008 | D |
| Example 5 | First Polarizing Plate 162 | Second Polarizing Plate 181 | Liquid Crystal Cell 172 | SK2057 | 0.006 | D |
| Example 6 | First Polarizing Plate 162 | Second Polarizing Plate 181 | Liquid Crystal Cell 173 | SK2057 | 0.003 | D |
| Example 7 | First Polarizing Plate 163 | Second Polarizing Plate 181 | Liquid Crystal Cell 173 | SK2057 | 0.003 | B |
| Example 8 | First Polarizing Plate 163 | Second Polarizing Plate 181 | Liquid Crystal Cell 173 | SK1478 | 0.003 | A |
| Example 9 | First Polarizing Plate 161 | Second Polarizing Plate 181 | Liquid Crystal Cell 172 | SK1478 | 0.005 | B |
| Comparative Example 1 | First Polarizing Plate 161 | Second Polarizing Plate 181 | Liquid Crystal Cell 174 | SK2057 | 0.012 | C |
| Comparative Example 2 | Second Polarizing Plate 181 | Second Polarizing Plate 181 | Liquid Crystal Cell 173 | SK2057 | 0.015 | C |

As shown in Table 2, it has been confirmed that desired effects are obtained with the liquid crystal display device according to the embodiment of the invention.

EXPLANATION OF REFERENCES

1: protective layer of first polarizing plate
2: first polarizer
3: absorption axis of first polarizer
4: second optically anisotropic layer
5: first optically anisotropic layer
6: slow axis of first optically anisotropic layer
7: upper substrate of liquid crystal cell
8: liquid crystal compound (liquid crystal layer)
9: lower substrate of liquid crystal cell
10: liquid crystal cell-side protective layer of second polarizing plate
11: second polarizer
12: absorption axis of second polarizer
13: backlight-side protective layer of second polarizing plate
14: backlight unit
15: optically anisotropic layer
16: first polarizing plate
17: liquid crystal cell
18: second polarizing plate
30: subpixel
30R: red subpixel
30G: green subpixel
30B: blue subpixel
32, 34, 36, 38: side
40: first portion
42: second portion
100: optical member measuring depolarization degree
101: polarizer used for measuring depolarization degree
102: polarizer used for measuring depolarization degree
103: spectral luminance meter

What is claimed is:

1. A liquid crystal display device comprising at least:
a first polarizer;
an optically anisotropic layer;
a liquid crystal cell; and
a second polarizer, in this order,
wherein the liquid crystal cell is an IPS mode or FFS mode liquid crystal cell which has a pair of substrates opposed to each other, at least one of which has an electrode, and a liquid crystal layer disposed between the pair of substrates and containing a liquid crystal compound whose alignment is controlled, and in which an electric field having a component parallel to the substrate is formed by the electrode,
the liquid crystal cell has pixels with a screen resolution of 250 ppi or more,
the pixels each have at least blue, green, and red subpixels,
the subpixel has a chevron structure in which an angle formed between at least one side of the structure and an absorption axis of the first polarizer or an absorption axis of the second polarizer is larger than 0° and not larger than 5°, and
a depolarization degree of the liquid crystal cell in a visible light region satisfies Expressions (1) and (2), $$DI\_blue(\varphi=0°, \theta=60°)/DI\_red(\varphi=0°, \theta=60°) > 0.80 \quad \text{Expression (1):}$$

$$DI\_blue(\varphi=90°, \theta=60°)/DI\_red(\varphi=90°, \theta=60°) > 0.80 \quad \text{Expression (2):}$$

where DI_blue ($\varphi=0°$, $\theta=60°$) represents an average depolarization degree of the liquid crystal cell at wavelengths of 400 to 500 nm at an angle of 60° formed from a normal direction of the liquid crystal cell in an absorption axis direction of the polarizer on the viewing side in the liquid crystal display device, DI_red ($\varphi=0°$, $\theta=60°$) represents an average depolarization degree of the liquid crystal cell at wavelengths of 600 to 700 nm at an angle of 60° formed from the normal direction of the liquid crystal cell in the absorption axis direction of the polarizer on the viewing side in the liquid crystal display device, DI_blue ($\varphi=90°$, $\theta=60°$) represents an average depolarization degree of the liquid crystal cell at wavelengths of 400 to 500 nm at an angle of 60° formed from the normal direction of the liquid crystal cell in a transmission axis direction of the polarizer on the viewing side in the liquid crystal display device, and DI_red ($\varphi=90°$, $\theta=60°$) represents an average depolarization degree of the liquid crystal cell at wavelengths of 600 to 700 nm at an angle of 60° formed from the normal direction of the liquid crystal cell in the transmission axis direction of the polarizer on the viewing side in the liquid crystal display device.

2. The liquid crystal display device according to claim 1, wherein $\Delta$nd of the liquid crystal layer at a wavelength of 550 nm is 330 nm or less.

3. The liquid crystal display device according to claim 1, wherein an in-plane retardation Re1 (550) at a wavelength of 550 nm and a thickness-direction retardation Rth1 (550) at a wavelength of 550 nm in the optically anisotropic layer satisfy Expressions (3) and (4);

$200 \text{ nm} \leq Re1(550) \leq 400 \text{ nm}$  Expression (3):

$-40 \text{ nm} \leq Rth1(550) \leq 40 \text{ nm}$  Expression (4).

4. The liquid crystal display device according to claim 1, wherein the optically anisotropic layer is a laminate of a first optically anisotropic layer and a second optically anisotropic layer,
an in-plane retardation Re1 (550) at a wavelength of 550 nm and a thickness-direction retardation Rth1 (550) at a wavelength of 550 nm in the first optically anisotropic layer satisfy Expressions (5) and (6), and
an in-plane retardation Re2 (550) at a wavelength of 550 nm and a thickness-direction retardation Rth2 (550) at a wavelength of 550 nm in the second optically anisotropic layer satisfy Expressions (7) and (8);

$80 \text{ nm} \leq Re1(550) \leq 200 \text{ nm}$  Expression (5):

$20 \text{ nm} \leq Rth1(550) \leq 150 \text{ nm}$  Expression (6):

$0 \text{ nm} \leq Re2(550) \leq 40 \text{ nm}$  Expression (7):

$-160 \text{ nm} \leq Rth2(550) \leq -40 \text{ nm}$  Expression (8).

5. The liquid crystal display device according to claim 4, wherein the first optically anisotropic layer is a positive A-plate, and the second optically anisotropic layer is a positive C-plate.

6. The liquid crystal display device according to claim 4, wherein at least one of the first optically anisotropic layer or the second optically anisotropic layer is a film in which a liquid crystal compound is fixed in an aligned state.

7. The liquid crystal display device according to claim 1, wherein the optically anisotropic layer is directly adhered to the first polarizer via a polyvinyl alcohol-based adhesive.

8. The liquid crystal display device according to claim 1, wherein the optically anisotropic layer is directly adhered to the first polarizer via a curable adhesive composition which is cured by irradiation with active energy rays or heating.

9. The liquid crystal display device according to claim 1, wherein an angle formed between, among sides forming an outline of the chevron structure which is a bent structure bent at a central portion, one side forming a bending line passing through the central portion and the absorption axis of the first polarizer or the absorption axis of the second polarizer is larger than 0° and not larger than 5°.

10. The liquid crystal display device according to claim 2, wherein an in-plane retardation Re1 (550) at a wavelength of 550 nm and a thickness-direction retardation Rth1 (550) at a wavelength of 550 nm in the optically anisotropic layer satisfy Expressions (3) and (4);

$200 \text{ nm} \leq Re1(550) \leq 400 \text{ nm}$  Expression (3):

$-40 \text{ nm} \leq Rth1(550) \leq 40 \text{ nm}$  Expression (4).

11. The liquid crystal display device according to claim 2, wherein the optically anisotropic layer is a laminate of a first optically anisotropic layer and a second optically anisotropic layer,
an in-plane retardation Re1 (550) at a wavelength of 550 nm and a thickness-direction retardation Rth1 (550) at a wavelength of 550 nm in the first optically anisotropic layer satisfy Expressions (5) and (6), and
an in-plane retardation Re2 (550) at a wavelength of 550 nm and a thickness-direction retardation Rth2 (550) at a wavelength of 550 nm in the second optically anisotropic layer satisfy Expressions (7) and (8);

$80 \text{ nm} \leq Re1(550) \leq 200 \text{ nm}$  Expression (5):

$20 \text{ nm} \leq Rth1(550) \leq 150 \text{ nm}$  Expression (6):

$0 \text{ nm} \leq Re2(550) \leq 40 \text{ nm}$  Expression (7):

$-160 \text{ nm} \leq Rth2(550) \leq -40 \text{ nm}$  Expression (8).

12. The liquid crystal display device according to claim 11, wherein the first optically anisotropic layer is a positive A-plate, and the second optically anisotropic layer is a positive C-plate.

13. The liquid crystal display device according to claim 11, wherein at least one of the first optically anisotropic layer or the second optically anisotropic layer is a film in which a liquid crystal compound is fixed in an aligned state.

14. The liquid crystal display device according to claim 2, wherein the optically anisotropic layer is directly adhered to the first polarizer via a polyvinyl alcohol-based adhesive.

15. The liquid crystal display device according to claim 2, wherein the optically anisotropic layer is directly adhered to the first polarizer via a curable adhesive composition which is cured by irradiation with active energy rays or heating.

16. The liquid crystal display device according to claim 2, wherein an angle formed between, among sides forming an outline of the chevron structure which is a bent structure bent at a central portion, one side forming a bending line passing through the central portion and the absorption axis of the first polarizer or the absorption axis of the second polarizer is larger than 0° and not larger than 5°.

17. The liquid crystal display device according to claim 3, wherein the optically anisotropic layer is directly adhered to the first polarizer via a polyvinyl alcohol-based adhesive.

18. The liquid crystal display device according to claim 3, wherein the optically anisotropic layer is directly adhered to the first polarizer via a curable adhesive composition which is cured by irradiation with active energy rays or heating.

19. The liquid crystal display device according to claim 3, wherein an angle formed between, among sides forming an outline of the chevron structure which is a bent structure bent at a central portion, one side forming a bending line passing through the central portion and the absorption axis of the first polarizer or the absorption axis of the second polarizer is larger than 0° and not larger than 5°.

20. The liquid crystal display device according to claim 4, wherein the optically anisotropic layer is directly adhered to the first polarizer via a polyvinyl alcohol-based adhesive.

* * * * *